(12) United States Patent
Kanesaka

(10) Patent No.: US 6,619,831 B2
(45) Date of Patent: Sep. 16, 2003

(54) STRIP LIGHT EMITTER

(76) Inventor: Koichi Kanesaka, 10-14-42, Yachiyodaikita, Yachiyo-city, Chiba-pref. (JP)

( * ) Notice: Subject to any disclaimer, the term of this patent is extended or adjusted under 35 U.S.C. 154(b) by 0 days.

(21) Appl. No.: 09/796,367

(22) Filed: Mar. 2, 2001

(65) Prior Publication Data

US 2001/0036082 A1 Nov. 1, 2001

(30) Foreign Application Priority Data

Apr. 26, 2000 (JP) .......................................... 2000-126700

(51) Int. Cl.$^7$ ................................................. F21V 7/04
(52) U.S. Cl. ....................... 362/555; 362/103; 362/105; 362/108; 362/800; 362/240; 362/249
(58) Field of Search ................................ 362/555, 103, 362/105, 108, 800, 240, 249

(56) References Cited

U.S. PATENT DOCUMENTS

| | | | | |
|---|---|---|---|---|
| 5,070,436 A | * | 12/1991 | Alexander et al. | 340/321 |
| 5,130,909 A | * | 7/1992 | Gross | 362/153 |
| 5,321,593 A | * | 6/1994 | Moates | 362/227 |
| 5,495,401 A | * | 2/1996 | Evans | 116/26 |
| 5,575,554 A | * | 11/1996 | Guritz | 362/103 |

* cited by examiner

Primary Examiner—Sandra O'Shea
Assistant Examiner—Bertrand Zeade
(74) Attorney, Agent, or Firm—Greenblum & Bernstein, P.L.C.

(57) ABSTRACT

A strip light emitter comprises an LED (light-emitting diode) light-emitting strip composed of a plurality of LEDs connected continuously in parallel between two conductors that make up negative and positive electrodes and are disposed roughly parallel to each other, and strip-shaped synthetic resin that is wider than the LED light-emitting strip and covers the LED light-emitting strip. The LED light-emitting strip can be configured to emit light from both sides, be covered by a synthetic resin made from strip-shaped transparent vinyl with half-turn twists, be configured to be flexible by bringing the conductors close together, be provided with reflective sheets, be configured as a triangular marker, and/or be configured a buoyant marker for sea rescue having air pockets.

4 Claims, 6 Drawing Sheets

STRIP LIGHT EMITTER

BACKGROUND OF THE INVENTION

1. Field of the Invention

This invention relates to a light emitter wherein a plurality of LEDs (light-emitting diodes) are arranged in a strip and more particularly to a strip-shaped illumination device covered with a transparent synthetic resin, whereby it can be flexed and twisted without short-circuiting and is made buoyant for use in various applications.

2. Prior Art Statement

Prior-art illumination devices used mini-incandescent lights often used in Christmas decorations, etc., and had a structure wherein the mini-incandescent lights were each connected in parallel to two long conductors by hand, after which the conductors were twisted together. Therefore, in addition to the need for an operation to connect the mini-incandescent lights in parallel, they were bundled by twisting the conductors together, which were made complex by the parallel connections, in order to make the lights easier to handle, but they would still become tangled and were often extremely difficult to handle. Further, if not properly stored after using, the conductors would become tangled, which made them difficult to use again.

Of course, series connection can be used to prevent the connections or conductors from becoming tangled, but if even one light bulb stops functioning, then none of the lights work. In addition, in illumination devices such as those used in road construction, the light sources are housed in a protective tube or covering, which requires that the light source be placed in a tube and the wiring be supported, thus making operation more difficult and more costly.

The use of LEDs (light-emitting diodes) has been proposed before to make handling easier, but because of the low light intensity of prior art diodes, the use of LEDs was not actively pursued. They could also not be used outdoors.

The object of this invention is to offer a strip light emitter as an easy-to-handle, strip-shaped illumination device that eliminates the high cost of the manual connection operation, avoids the tangling that occurs when taking out and putting away, and does not require the replacement of incandescent bulbs when they burn out as in prior art illumination devices.

SUMMARY OF THE INVENTION

In order to achieve the above object, the strip light emitter of this invention comprises a plurality of LEDs (light-emitting diodes) connected continuously in parallel between two conductors that make up the negative electrode and positive electrode and are disposed roughly parallel to each other to form an LED light-emitting strip, and said LED light-emitting strip is covered with a strip-shaped synthetic resin that is wider than the LED light-emitting strip.

Further, the synthetic resin can be made from transparent vinyl, and the two conductors can be disposed in close proximity to each other between the LEDs such that they do not short-circuit and the strip light emitter can be flexed. Also, a configuration is possible wherein the two conductors are disposed in close proximity to each other between the LEDs such that they do not short-circuit and slits are cut in the synthetic resin between the LEDs to a depth that does not cut the conductors.

In another aspect, the invention provides a configuration wherein a gas or solid with a specific gravity lighter than water is injected in part of the strip light emitter to allow it to float on water, or a sheet-shaped reflective sheet that reflects light is inserted or adhered to part of the strip light emitter to facilitate the reflection of light from a light source. A configuration is also possible wherein three or more conductors are disposed roughly parallel to each other and a plurality of LEDs are connected in parallel between the conductors to form a continuous series of a plurality of LEDs connected in parallel.

In another aspect, the invention provides a configuration wherein the LEDs are a type with a light-emitting surface on one side and the LEDs are connected in parallel to the two conductors such that the light-emitting surfaces of said LEDs are alternately or randomly reversed to form an LED light-emitting strip.

A configuration is also possible wherein the LEDs are a type with a light-emitting surface on one side and the synthetic resin used to cover the strip is a soft material, whereby the synthetic resin between the LEDs can be twisted one half turn to cause the light-emitting surfaces of the LEDs to be alternately reversed.

A configuration is also possible wherein the strip light emitter is adhered or affixed to the triangular frame of an emergency warning plate that is legally required equipment on some vehicles, or the strip light emitter can be adhered to an occupational safety vest. In another aspect, the invention provides a configuration wherein the strip light emitter is adhered to a material that floats such that it can be opened up in the water to become a lighted marker for sea rescue and is also adhered to a shape-memory alloy wire formed in a shape that opens up on the water.

A configuration is also possible wherein a plurality of LEDs are connected continuously in series within two conductors that make up the negative electrode and positive electrode and are disposed roughly parallel to each other to form an LED light-emitting strip, and said LED light-emitting strip is covered with a strip-shaped synthetic resin that is wider than the LED light-emitting strip.

DESCRIPTION OF THE PREFERRED EMBODIMENTS

Figure 1:
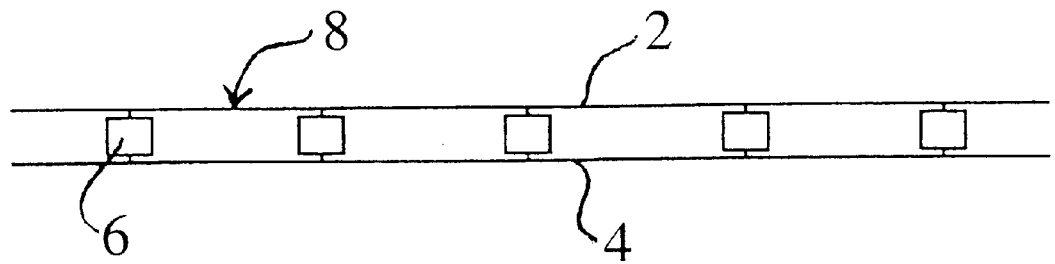
FIG. 1 is a schematic diagram of an LED light-emitting strip of this invention.

The strip light emitter of this invention is explained below based on the embodiments shown in the drawings. FIGS. 1 to 4 are plan views showing the basic configuration of a strip light emitter 1 according to the present invention. The strip light emitter 1 comprises a plurality of LEDs (light-emitting diode) 6, two conductors 2 and 4, and a strip-shaped covering. A LED light-emitting strip 8 is formed by connecting the plurality of LEDs continuously in parallel. The LEDs used here are a chip-type LEDs. However, the LED type is not limited to chips, and regular LEDs can also be used. As shown in FIG. 1, the LED light-emitting strip 8 forms a strip light emitter by electrically connecting a plurality of LEDs 6 in parallel continuously at fixed intervals between two conductors, which are a positive electrode 2 and a negative electrode 4 disposed roughly parallel to each other, and then connecting to a power source (not shown). The LED light-emitting strip can be manufactured by an automated wiring process that automates the soldering of the LEDs and conductors.

Figure 2:
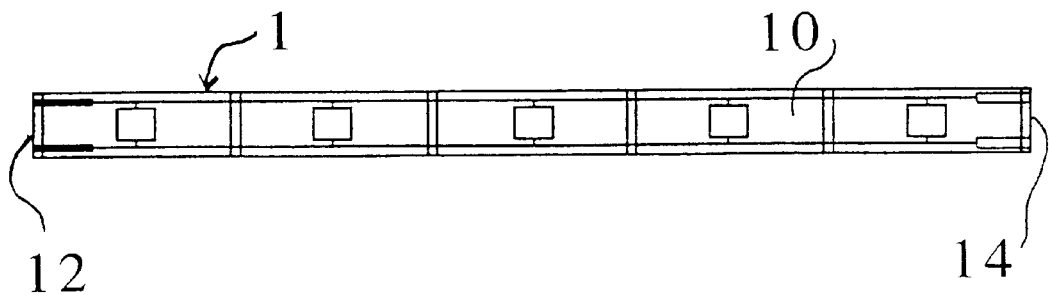
FIG. 2 is a schematic diagram of a strip light emitter of this invention.
Figure 3:
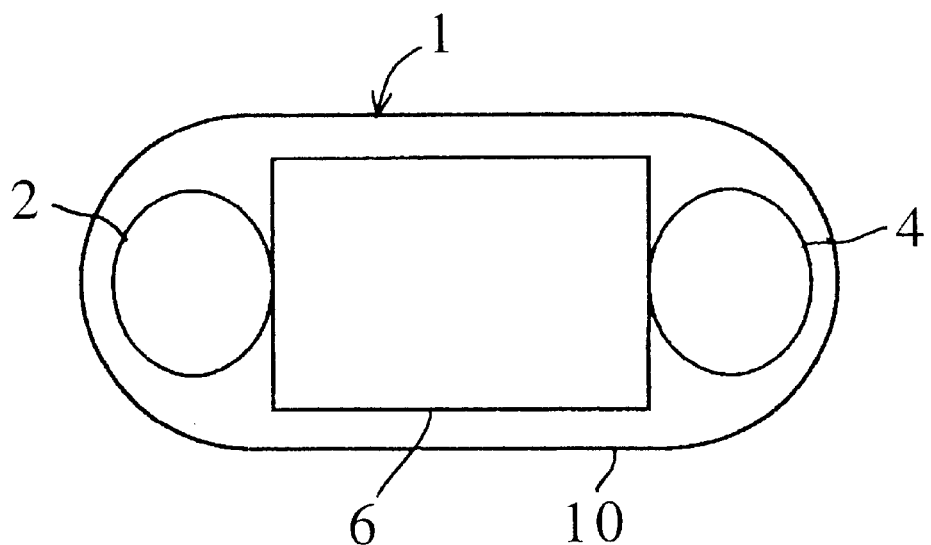
FIG. 3 is a schematic diagram of a strip light emitter of this invention.
Figure 4:
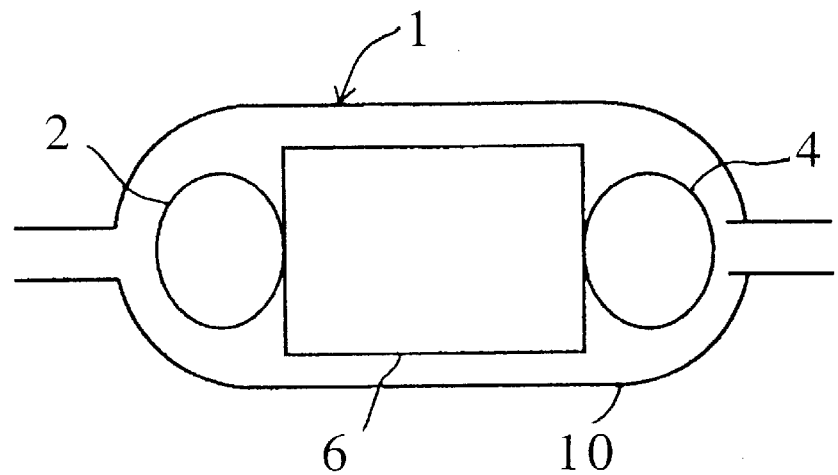
FIG. 4 is a cross section of another strip light emitter of this invention.

FIG. 2 shows the strip light emitter 1, wherein the abovementioned electrically connected LED light-emitting strip 8 is passed through a wire manufacturing machine or the like and is covered by a transparent vinyl 10. A cross section of the strip light emitter covered by the wire manufacturing machine, etc., is shown in FIG. 3. In this example, the cross section of the strip light emitter is 7 mm wide and 5 mm high. By manufacturing the LED light emitter by automated wiring and covering it with vinyl using a wire manufacturing machine or the like, the strip light emitter can be produced by a completely automated process, thus allowing production at low cost. It is also possible to use a method whereby the LED light emitter strip is sandwiched between two strip-shaped transparent vinyl sheets 10 as the cover material, after which both edges of the transparent vinyl and the regions between the LEDs are fused together by a welding process (high-frequency welding). A cross section of a strip light emitter manufactured by this welding process is shown in FIG. 4.

The strip light emitter is an extremely narrow "flat string shape" only a few millimeters in width, and therefore it can be easily flexed and is easy to handle for a wide range of applications. Further, since it is a long string shape and can be cut at any desired location as long as it is between LEDs, it can be cut to lengths to fit any application. Also, by using a male socket on one end 12 and a female socket on the other end 14, an interconnectable strip light emitter is realized whereby a strip light emitter of a desired length can be achieved by connecting together two or more of the unit strip light emitters.

Figure 5:
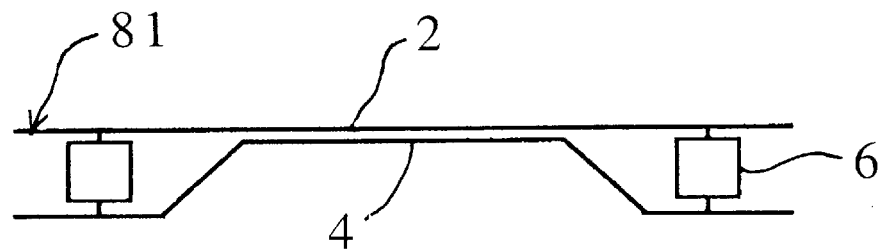
FIG. 5 is a schematic diagram of another LED light-emitting strip of this invention.
Figure 6:
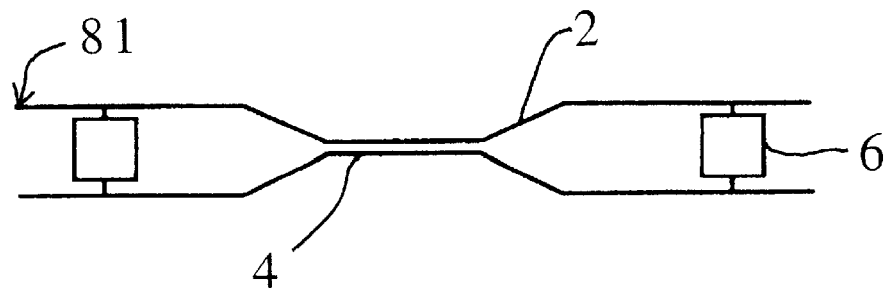
FIG. 6 is a schematic diagram of another LED light-emitting strip of this invention.

FIGS. 5 to 8 are schematic diagrams showing a flexible strip light emitter. In FIG. 5, the conductor 4 and conductor 2 are disposed such that they are brought close together in the cross direction between the LEDs 6, and in FIG. 6 the conductors 2 and 4 are disposed in the middle of the light-emitting strip 81 longitudinally. If the interval between the two conductors is fixed, the length of the conductors does not change, and therefore it is difficult to bend the strip in the longitudinal direction. However, since the two conductors are brought together as shown in FIGS. 5 and 6, it is possible to freely bend the entire LED light-emitting strip 81 left and right.

Figure 7:
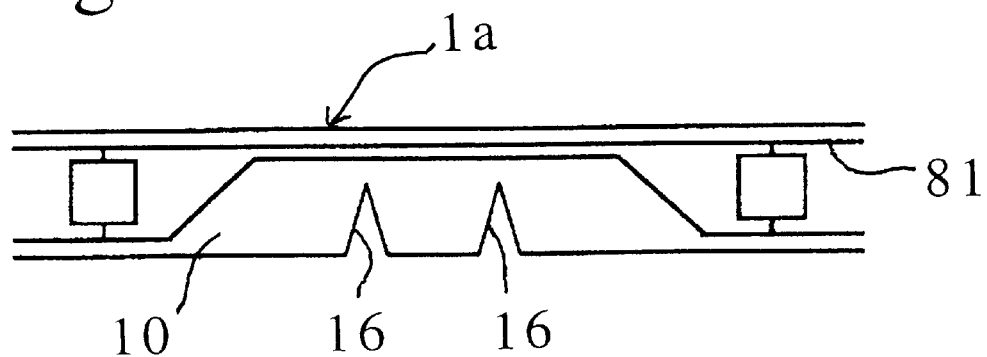
FIG. 7 is a schematic diagram of another strip light emitter of this invention.
Figure 8:
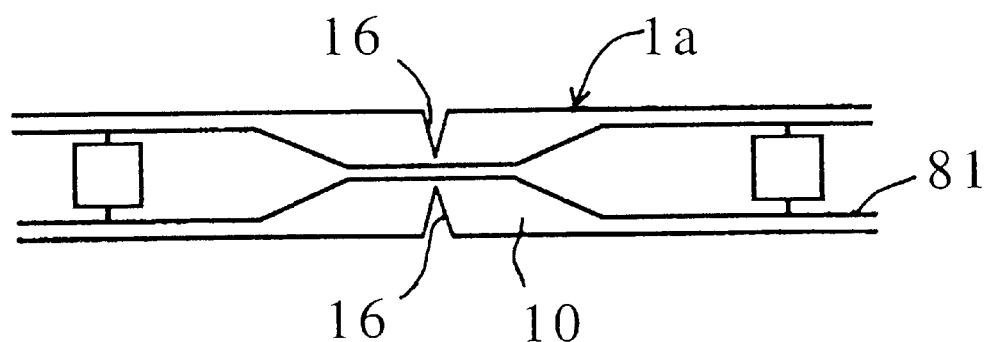
FIG. 8 is a schematic diagram of another strip light emitter of this invention.

Next, in another embodiment of the flexible strip light emitter shown in FIGS. 7 and 8, an LED light-emitting strip 81 wherein the width of the conductors described above is made narrow is covered with a transparent vinyl 10 and slits 16 are formed in the transparent vinyl between the LEDs. By this means, it is extremely easy to bend the strip light emitter in the desired direction at the slit locations. By being able to bend the strip light emitter 1 at prescribed locations, the strip light emitter 1 can be used to make designs or characters. The conductors 2 and 4 are disposed close to each other, but an interval must be provided between them such that they will not short-circuit when the strip light emitter is bent. Further, the depth, size and number of the slits 16 can be selected within a range that will not cut the conductors, maintain the strength of the strip light emitter, and ensure the insulation of the conductors.

Figure 9:
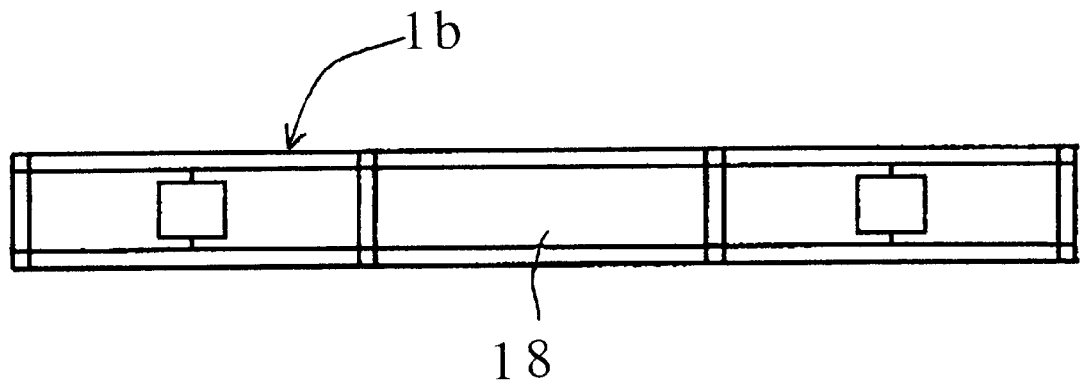
FIG. 9 is a schematic diagram of another strip light emitter of this invention.

FIG. 9 is a schematic diagram of a strip light emitter 1b that floats on water. When this LED light-emitting strip is covered with transparent vinyl, two locations are welded between each adjacent pair of LEDs, whereby an air pocket 18 in which air is trapped by the welding process is formed. The buoyancy obtained by these air pockets results in a strip light emitter that can float on water and can be used for illumination on water or used as a rescue signal marker for ships, etc.

Figure 10:
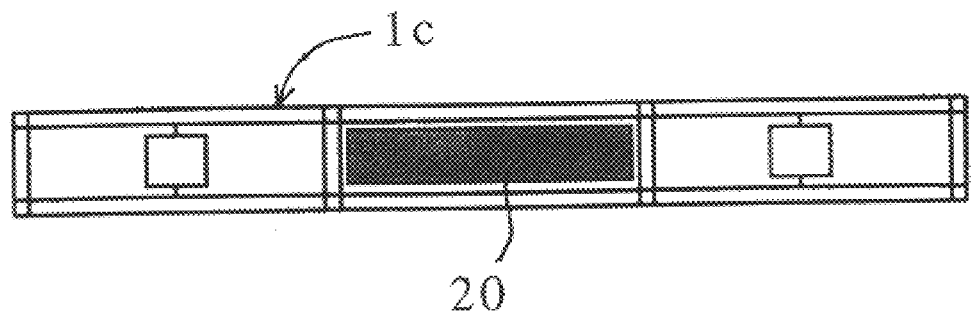
FIG. 10 is a schematic diagram of another strip light emitter of this invention.

FIG. 10 is a schematic diagram of a strip light emitter 1c with a reflective sheet. Here, when the LED light-emitting strip is covered with transparent vinyl, a flat reflective sheet 20 treated to reflect light off its surface is inserted between each adjacent pair of LEDs, and the vinyl is welded between either end of the reflective sheet and the LEDs. The combined effect of the light emitted from the LEDs and the reflective sheets yields a strip light emitter for use as a marker with a greater level of visibility for use in night safety devices, etc.

Figure 11:
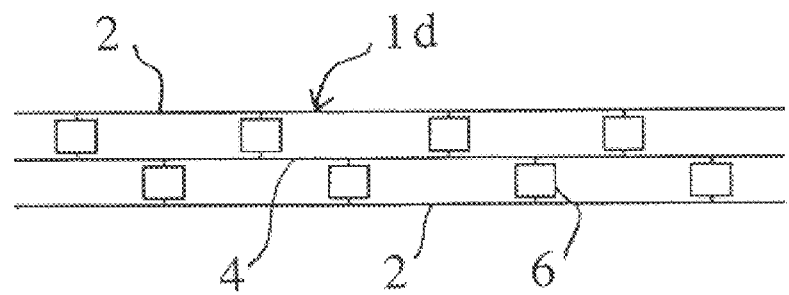
FIG. 11 is a schematic diagram of another strip light emitter of this invention.

FIG. 11 is a schematic diagram of a wide strip light emitter. The three conductors 2 and 4 are disposed in the order of positive electrode, negative electrode and positive electrode, and a plurality of LEDs 6 are connected in parallel between the conductors at fixed intervals such that they form two rows of staggered LEDs. By this means, a wide strip light emitter with a higher level of visibility can be made. Further, by using chip LEDs with a light-emitting surface on one side and connecting each row of LEDs such that they face opposite directions, a strip light emitter that emits light on the front and back is achieved.

Figure 12:
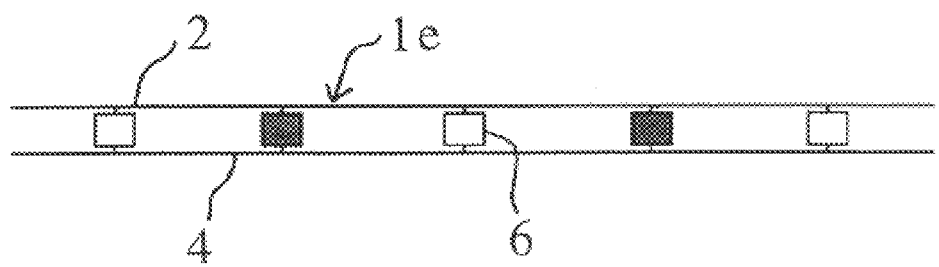
FIG. 12 is a schematic diagram of another strip light emitter of this invention.

FIG. 12 is a schematic diagram of a strip light emitter that can emit light on both sides, wherein chip LEDs with a light-emitting surface on one side are used as the LEDs, and after connecting the LEDs such that they alternately face in opposite directions, the strip is covered with transparent vinyl. The LEDs can be alternately faced in opposite directions a fixed number at a time or a random number at a time. By this means, a strip light emitter capable of emitting light on the front and back can be easily achieved.

Figure 13:
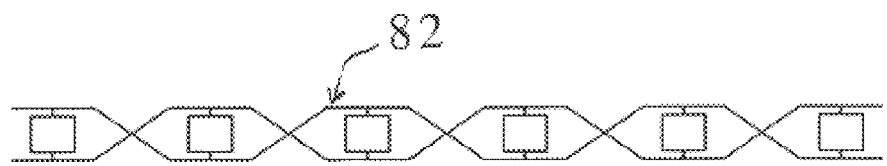
FIG. 13 is a schematic diagram of another LED light-emitting strip of this invention.
Figure 14:
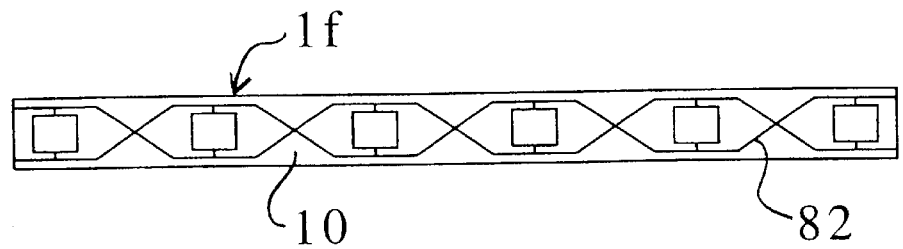
FIG. 14 is a schematic diagram of another strip light emitter of this invention.

The invention also provides a strip light emitter that can be twisted one half turn. This strip light emitter uses a synthetic resin made from a flexible material as the synthetic resin for covering, and therefore by twisting the synthetic resin one half turn between each adjacent pair of LEDs, the strip can be twisted one half turn such that the light-emitting surfaces of the LEDs alternately face in opposite directions. By this means, the strip light emitter can be twisted one half turn in one or multiple selected locations, thus yielding a strip light emitter capable of emitting light on the front and back. After twisting the LED light-emitting strip 82 one half turn as shown in FIG. 13, it can be covered by a strip-shaped covering material 10 as shown in FIG. 14 to make the strip light emitter 1f. In this case, coated conductors are used to prevent short-circuiting.

Figure 15:
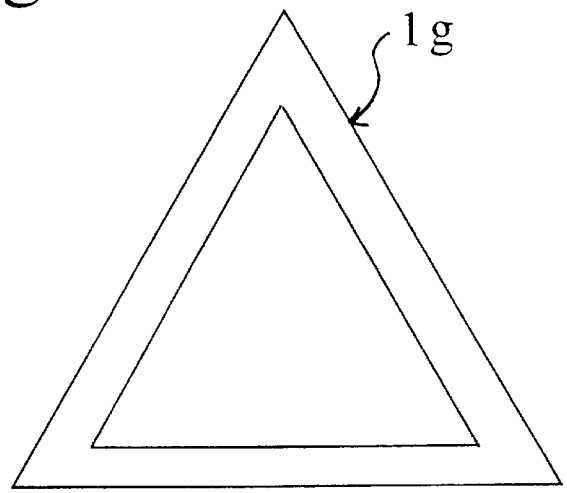
FIG. 15 is a schematic diagram of another strip light emitter of this invention.

FIG. 15 is a schematic diagram of a strip light emitter 1g for use in a triangular emergency warning plate, wherein the strip light emitter of FIGS. 1 to 4 is bent in two locations to form a triangle and is affixed by adhesion, etc., to a triangular frame made from plastic to form a triangular marker plate. Triangular markers are legally required equipment on some vehicles, and prior art products were mainly reflective tape applied to a frame. However, depending on the angle of incidence of the light, reflective tape has extremely poor visibility. The strip light emitter of this invention improves visibility, particularly from the side, due to the light emitted by the LEDs, and therefore a triangular marker plate with improved performance can be achieved.

Figure 16:
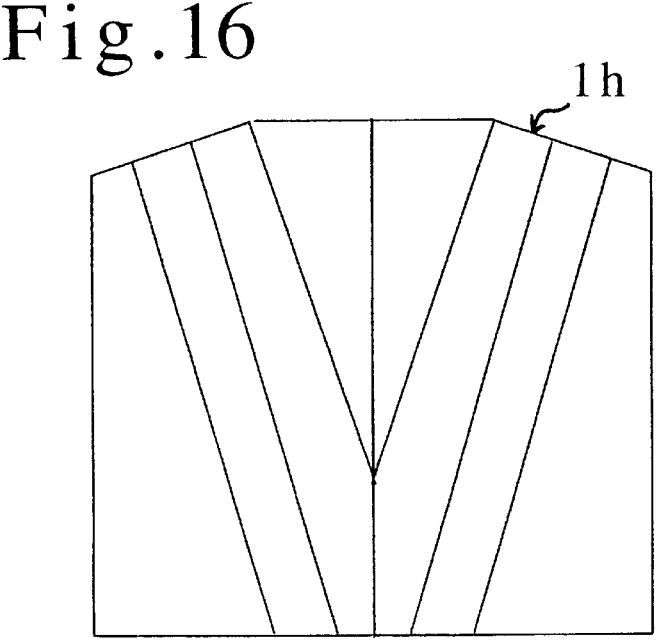
FIG. 16 is a schematic diagram of another strip light emitter of this invention.

FIG. 16 is a schematic diagram of the strip light emitter 1h, wherein the strip light emitter of FIGS. 1 to 4 is affixed to the front and/or back (not shown) of a night occupational safety vest. By this means, a safety vest with greater visibility due to the light emitter is achieved as compared to safety vests with only prior art reflective tape. By sewing surface fasteners with male and female surfaces to the strip light emitter of FIGS. 1 to 4 and to the safety vest, it becomes possible to attach and remove the strip light emitter by means of the surface fastener, thus yielding a safety vest with greater functionality.

Figure 17:
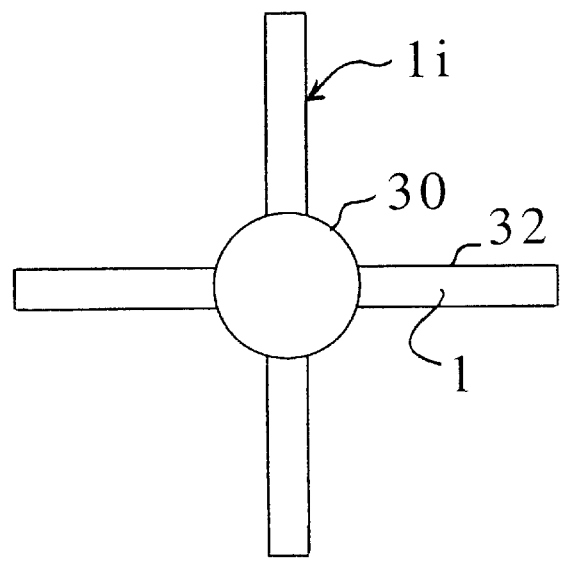
FIG. 17 is a schematic diagram of another strip light emitter of this invention.

FIG. 17 is a plan view of a strip light emitter 1i, which comprises a life vest or other member that floats, a battery box 30 equipped with a water sensor switch, shape-memory alloy wire 32 extending in four directions from the battery box, and strip light emitters 1 attached to each wire. The length of the strip light emitters 1, which make up a lighted marker (signal light) for sea rescue, is 3 to 5 meters each, and these are normally wound up into a compact shape and placed in a storage case (not shown) with the battery box 30 for use as an emergency marker. If an emergency occurs, the lid to the case is opened and the case is dropped on the water, whereby the shape-memory alloy wire returns to its original shape and automatically opens up in four directions and the water sensor switch lights the LEDs. The probability of rescue can be further enhanced by including a rescue signal device in the battery box.

Figure 18:
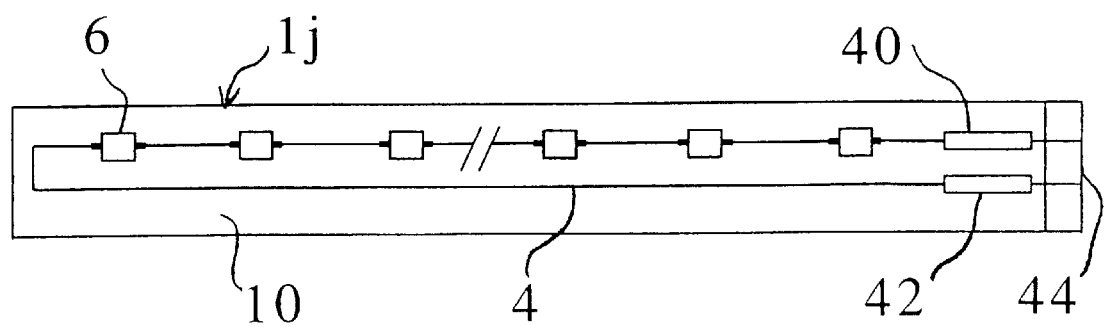
FIG. 18 is a schematic diagram of another strip light emitter of this invention.

FIG. 18 is a schematic diagram of a strip light emitter 1j. A plurality of LEDs 6 are connected in series to the conductors, a rectifying diode 40 is connected near the end of the conductors, a fuse 42 is connected near the end of the conductors 4, and the end member of the conductors is a plug 44 that can be inserted in a regular 100V AC power outlet to form the LED light-emitting strip 8, and this LED light-emitting strip is covered by a transparent vinyl 10 wider than the LED light-emitting strip. By using a transparent vinyl in a tube shape, the light-emitting strip can be used for tubular illumination.

Since the strip light emitter of the invention described above is configured as described above, it offers the following advantages.

1. Since a plurality of LEDs (light-emitting diodes) are connected continuously in parallel, it is an effective strip-shaped lighting fixture that is easy to handle and can be manufactured at low cost.
2. The light-emitting diodes are bright because they are covered with transparent vinyl.
3. The strip light emitter is functional because it can be flexed.
4. Slits are provided to allow extremely easy flexure of the strip.
5. Can be made buoyant on water, thus expanding the range of applications.
6. Reflective sheets are inserted in parts of the strip to facilitate reflection of light from a light source, thus enabling effective illumination.
7. Since it is a light-emitting strip with a plurality of wide LEDs connected continuously in parallel, it attracts attention better.
8. The light-emitting surfaces of the LEDs are alternately or randomly reversed, thus adding variation to where and how the strip light emitter can be used.
9. A flexible material is used as the synthetic resin for covering, and therefore a strip-shaped lighting fixture that easily emits light from both sides by twisting one half turn can be offered at low cost.
10. A triangular emergency warning marker plate carried onboard a vehicle is improved in visibility by attachment of the strip light emitter.
11. A conspicuous marker can be worn by affixing he strip light emitter to an occupational safety vest, thus improving the level of safety.
12. Can become a lighted marker for sea rescue that opens up and floats on the water, thus offering an effective marine marker at low cost.
13. A strip light emitter that is connected in series is also possible.

What is claimed is:

1. A strip light emitter comprising:
    an LED (light-emitting diode) light-emitting strip composed of a plurality of LEDs connected continuously in parallel between two conductors that make up negative and positive electrodes and are disposed roughly parallel to each other;
    strip-shaped synthetic resin that is wider than the LED light-emitting strip and covers and substantially encloses said LED light-emitting strip and the plurality of LEDs thereof so as to form a substantially flat strip light emitter; and
    wherein the two conductors are disposed in closer proximity to each other between the LEDs in the LED light-emitting strip such that they do not short-circuit and slits are cut in the synthetic resin between the LEDs to a depth that does not cut the conductors such that the strip light emitter can be flexed in a direction parallel to a width direction of the strip light emitter.

2. A strip light emitter comprising:
    an LED (light-emitting diode) light-emitting strip composed of a plurality of LEDs connected continuously in parallel between two conductors that make up negative and positive electrodes and are disposed roughly parallel to each other;
    strip-shaped synthetic resin that is wider than the LED light-emitting strip and covers and substantially encloses said LED light-emitting strip and the plurality of LEDs thereof so as to form a substantially flat strip light emitter; and wherein a gas or solid with a specific gravity lighter than water is injected in part of said strip light emitter to allow it to float on water.

3. A strip light emitter comprising:

an LED (light-emitting diode) light-emitting strip composed of a plurality of LEDs connected continuously in parallel between two conductors that make up negative and positive electrodes and are disposed roughly parallel to each other;

strip-shaped synthetic resin that is wider than the LED light-emitting strip and covers and substantially encloses said LED light-emitting strip and the plurality of LEDs thereof so as to form a substantially flat strip light emitter; and wherein said LEDs are a type with a light-emitting surface on one side and the synthetic resin used to cover the strip is a soft material, the synthetic resin between each adjacent pair of LEDs being twisted one half turn to cause the light-emitting surfaces of the LEDs to be alternately reversed.

4. A strip light emitter comprising:

an LED (light-emitting diode) light-emitting strip which includes a plurality of LEDs arranged at regular intervals and disposed between two round conductors;

each of said plurality of LEDs being connected in parallel to said two round conductors and being arranged directly between said two round conductors;

said plurality of LEDs and said two round conductors being arranged such that an axis which runs through centers of said two round conductors also runs through said plurality of LEDs;

a transparent synthetic resin covering arranged to substantially enclose said two round conductors and said plurality of LEDs; and said transparent synthetic resin covering having at least two external parallel surfaces, wherein said transparent synthetic resin covering comprises an overall width measured across the axis that is greater than an overall height measured across said at least two external parallel surfaces.

* * * * *